United States Patent [19]
Roth

[11] 3,742,072
[45] June 26, 1973

[54] NITRATION OF TOLUENE AND NITROTOLUENES TO FORM TNT

[76] Inventor: Milton Roth, 11 Lenape Avenue, Rockaway, N.J. 07866

[22] Filed: Mar. 28, 1972

[21] Appl. No.: 238,975

[52] U.S. Cl. ............................................... 260/645
[51] Int. Cl. ............................................. C07c 79/10
[58] Field of Search ...................................... 260/645

[56] References Cited
UNITED STATES PATENTS
3,000,972   9/1961   Bonetti ............................... 260/645
FOREIGN PATENTS OR APPLICATIONS
1,054,571   1/1967   Great Britain ....................... 260/645
OTHER PUBLICATIONS
Urbanski, Chemistry and Technology of Explosives, Vol. 1, MacMillan Co., New York, 1964, pp. 391-2 TP27047

*Primary Examiner*—Leland A. Sebastian
*Attorney*—Harry M. Saragovitz, Edward J. Kelly, A. Victor Erkkila et al.

[57] ABSTRACT

The invention provides a novel method for recovering and recycling nitrotoluenes contained in aqueous waste liquors obtained in the manufacture of TNT, particularly from systems for filtering vapors from spent sulfuric acid concentrators. In the novel method, the nitrotoluenes are efficiently and economically extracted from such liquors with toluene and the toluene containing the extracted nitrotoluenes is nitrated to produce TNT of military specification grade.

4 Claims, No Drawings

NITRATION OF TOLUENE AND NITROTOLUENES TO FORM TNT

The invention described herein may be manufactured, used and licensed by or for the Government for governmental purposes without the payment to me of any royalty thereon.

BACKGROUND OF THE INVENTION

In the manufacture of the high explosive 2,4,6-trinitrotoluene, usually referred to simply as TNT, large amounts of aqueous waste liquors containing isomeric di- and trinitrotoluenes are produced and are generally discharged into streams. These aqueous liquors turn red by photochemical reaction and give rise to a severe pollution problem. No economically satisfactory method has been devised for treating such liquor to eliminate this pollution problem.

SUMMARY OF THE INVENTION

Accordingly, it is an object of this invention to provide a process for economically treating aqueous waste liquors containing mono-, di- and tri- nitrotoluenes to recover their content of nitrotoluenes and thereby eliminate the pollution problem associated with such liquors.

Another object is to provide a simple and economical process for recovering and recycling mono-, di- and trinitrotoluenes present in aqueous waste liquors, as produced in the manufacture of TNT.

The foregoing objects can be achieved according to the present invention by extracting aqueous waste liquors containing mono-, di- and trinitrotoluenes with toluene and then recycling the toluene extract thus obtained to the nitration reaction. In particular, the process of the invention comprises subjecting waste liquors containing small amounts, e.g., less than about 0.1 percent by weight, of di- and trinitrotoluenes, as obtained in systems for filtering vapors from spent acid concentrators in TNT plants, to extraction with toluene, and nitrating the toluene containing such extracted nitrotoluenes in conventional manner with a mixture of nitric and sulfuric acids to produce TNT of military specification grade.

I have discovered not only that toluene is an efficient solvent which is capable of completely removing mono-, di- and trinitrotoluenes from dilute aqueous waste liquors containing same, but that the toluene solution thus obtained containing significant amounts, e.g. between about 0.1 percent and 10 percent by weight, of such nitrotoluenes, particularly mixtures of isomeric di- and trinitrotoluenes, can be nitrated, under the same conditions as used for nitrating purified toluene to TNT, to produce military specification grade TNT in excellent yield. This was not to be expected, since in the past it has been considered necessary to employ a toluene starting material of good purity for manufacturing military specification grade TNT.

In carrying out the process of the present invention, a relatively small amount of toluene is sufficient to completely remove the mono-, di- and trinitrotoluenes from aqueous waste liquors. For example, as little as 1 volume of toluene can be used to completely extract and remove the nitrotoluenes at room temperature from about 150 volumes of aqueous waste liquor, which contains about 0.03 percent by weight of said nitrotoluenes, consisting of a mixture of isomeric di- and trinitrotoluenes, together with small amounts of sulfuric and nitric acids. This can be accomplished in a plurality of extraction steps, for example, by vigorously agitating 1 volume of toluene with 2 volumes of the aqueous waste liquor, then allowing the toluene and aqueous phases to separate and reusing the toluene phase to extract additional waste liquor in similar manner. The extraction can be carried out discontinuously or continuously, for example, by flowing streams of toluene and the aqueous waste liquor in 1:2 or other suitable ratio, counter-currently or cocurrently through a vertical column provided with successive agitation and settling zones, and recycling the toluene phase as long as it is capable of completely removing the nitrotoluenes from the aqueous phase before the latter leaves the column. The toluene recycled in this manner gradually increases in concentration of dissolved mono-, di- and trinitrotoluenes and ultimately is no longer able to completely remove such nitrotoluenes from the aqueous waste liquor, so that when that point is reached the recycled toluene is replaced by fresh toluene. During the extraction process of the present invention a very small amount of toluene is transferred to the aqueous waste liquor due to its negligible, albeit finite, solubility in water. If necessary or desired, the toluene can be removed from such liquors in suitable manner, e.g. by absorption with activated carbon columns from which the toluene can be recovered by heating in known manner.

EXAMPLE 1

The aqueous waste liquor subjected to extraction with toluene was obtained from a Mahon fog filter used to scrub vapors produced from a spent sulfuric acid concentrator in a TNT manufacturing plant. It is referred to as Mahon water in the following examples and had the following chemical anaysis:

Characteristics of Mahon Water

| | |
|---|---|
| Color | Very light straw |
| Solids in water | Essentially 2,4-dinitrotoluene |
| Specific gravity at 22°C, g/ml | 1.000 |
| pH | 2.3 |
| Residue after evaporation of $H_2O$,% | 0.067 |
| Sulfate, as $H_2SO_4$, % | 0.03 |
| Nitrate, as $HNO_3$, % | 0.003 |
| Toluene extract, % | 0.027 |
| Composition of toluene extract | |
| 2,4-dinitrotoluene | 72.7 |
| 2,5-dinitrotoluene | 0.6 |
| 2,6-dinitrotoluene | 5.0 |
| 3,4-dinitrotoluene | 1.2 |
| 2,4,6-trinitrotoluene | 20.5 |
| 2,4,5-trinitrotoluene | trace |

Part A. Extraction of Mahon Water With Toluene 1,000 ml of the Mahon water was vigorously agitated for several minutes with 500 ml of reagent grade toluene at room temperature, after which the layers were allowed to separate and the aqueous layer was discarded. The toluene layer thus obtained was agitated with another 1,000 ml portion of the Mahon water in similar manner and the aqueous layer was discarded. The procedure was repeated until a total of 76 1,000 ml portions of the Mahon water had been extracted. The total content of nitrotoluenes in the final toluene layer thus obtained was determined by analysis to be 6.4 percent by weight. The first through the final aqueous layers obtained above were examined for absorbance in the ultraviolet region between 225 mu and 300 mu; they showed no absorbance band with a maximum at 275 mu corresponding to the presence of nitrotoluenes, indicating that the toluene had completely extracted the nitrotoluenes from the Mahon water.

Part B. Nitration of Toluene Extract to TNT

Note: The nitration method employed below on a laboratory scale is identical to the standard procedure used for nitrating toluene in the commercial manufacture of military grade TNT.

Mononitration 1,375 g of mixed acid ($H_2SO_4$ + $HNO_3$) of the composition given below (1) was placed in a 250 ml three-neck, round bottom flask equipped with a stirrer, thermometer, air condenser and addition funnel. Vigorous stirring was started and the temperature was increased to 40°–43°C with a water bath. 214 g of the toluene extract containing 6.4 percent nitrotoluenes obtained in part A was then added. The temperature was allowed to rise slowly to 57°C at a rate of approximately 2.5°C/min at the beginning of the toluene addition, and then maintained during the remainder of its duration, which took a total of 13 minutes. The dark red reaction mixture then was held at that temperature for 4 minutes, and subsequently allowed to cool to 53°C with reduced stirring. The stirrer then was stopped. When the temperature reached 51°C the mixture was poured into a separatory funnel. At 46°C the acid was drained and the mono-oil (MNT) was collected. The product weighed 346 g.

Binitration 1,172 g of mixed acid of the composition noted below (2) was placed in a 300 ml round bottom three-neck flask equipped with a thermometer, air condenser, stirrer, addition funnel, and heating mantle, and also a 6 mm stopcock on the bottom in order that acid-DNT separation could be accomplished. While stirring, the temperature was raised to 74°–77°C. 275 g of MNT, the above mono-oil, then was added slowly. The temperature was not allowed to exceed 77°C for the first 5 minutes, but subsequently the exotherm was allowed to raise the temperature in 10 minutes to 85°C. The remainder of the mono-oil then was added at that temperature over 18 minutes. After the addition was complete, the temperature was held at 85°C for 7 minutes and then allowed to drop to 79°C. After settling for 10 minutes the acid and oil were separated. The impure bi-oil (DNT) weighed 473 grams.

Trinitration 1,150 g of mixed acid of the composition noted below (3) was placed in a 300 ml three-neck round bottom flask fitted with a stirrer, thermometer, heated addition funnel, and heating mantle. The temperature was raised to 91°C. While stirring and maintaining that temperature, 473 g of the bi-oil obtained above was added over 30 minutes. The bi-oil was kept in the liquid state by means of the heated addition funnel. After all of the bi-oil was in, the temperature was held another two minutes in order to determine whether any strong exotherm was present. This was, however, not the case. The temperature then was raised over 14 minutes to 112°C and held there for 4 minutes. The mixture then was cooled to 107°C with stirring and then allowed to settle and cool to 91°–93°C. The acid layer then was separated.

The tri-oil then was introduced into 2,500 ml of water at a temperature of 78°C. The mixture was stirred rapidly and the temperature allowed to drop to 68°C. Crystallization occurred at 70°C, but no evidence of a temperature rise was observed. The mixture then was maintained at 69° to 71°C and neutralized to pH 7.0 with 80.0 cc of 23.5% $Na_2CO_3$. The color of the aqueous phase became purple during neutralization. While maintaining the temperature, 150 cc of sellite solution (16% $Na_2SO_3$, 1% $NaHSO_3$, 83% $H_2O$) was added over 12 minutes. The color became red. The mixture then was cooled to 69°C and the TNT was separated by filtration. The TNT then was washed with water at 65°–67°C (6 × 1,000 ml). The light yellow product was dried under vacuum over $P_2O_5$ for 2 hours. The crude TNT weighed 286 g, melting point 79.5°–80.2°C.

Melt Wash of Crude TNT 125 g of the crude TNT obtained above was added to 750 ml of water at 80°C in a 2,000 ml three-neck flask fitted with heating mantle, stirrer, thermometer, and lower drain. The temperature was raised to 90°C with stirring and the water layer then was siphoned off. The molten TNT then was heated to 98°C over 15 minutes with stirring. A vacuum hose was inserted into the flask to remove the water vapor produced. When the TNT ceased to bubble and became clear it was drained into an aluminum sheet and cooled. The crystalline yellow TNT was broken up and bottled. The product weighed 103 g (overall yield 62 percent), melting point 80.3°C.

The TNT thus obtained from toluene containing 6.4 percent nitrotoluenes was of military specification grade, as shown by the following analysis:

TNT

| Test | TNT (Example 1) | U.S. Military Specification Requirements |
|---|---|---|
| Setting Point | 80.30°C | 80.20 (min)°C |
| Acidity | 0.00 | 0.02% (max) |
| Alkalinity | 0.00 | 0 |
| Insolubles | 0.01 | 0.05% (max) |
| Sodium | 0.000 | 0.001% (max) |
| Moisture | 0.0 | 0.10% (max) |
| Color | yellow | light yellow through buff |

The nitrating acids employed in the example had the following compositions:

| | $H_2O$ percent | Total acidity calculated as sulfuric acid | Total sulfuric acid, percent | Total nitric acid, percent | Actual sulfuric acid, percent | Actual nitric acid, percent | Nitrosyl sulfuric acid, percent |
|---|---|---|---|---|---|---|---|
| 1. | 22.57 | 77.78 | 59.80 | 23.11 | 44.01 | 12.96 | 20.46 |
| 2. | 15.14 | 82.43 | 67.38 | 19.38 | 61.15 | 15.05 | 8.66 |
| 3. | −5.75 | 101.27 | 85.3 | 20.5 | 85.0 | 20.4 | .33 |

The following tables compare the results obtained by nitrating the aforesaid toluene extract containing 6.4 percent nitrotoluenes and those obtained by nitrating reagent grade toluene under the same conditions as described in the foregoing example.

TABLE 1

Preparation of Mononitrotoluenes

| Run No. | Toluene source | Quantity of toluene, g. | Quantity mono acid, g. | Ratio toluene to acid | Product weight, g. | Percent yield | MNT O | MNT M | MNT P | DNT 2,4 | DNT 2,5 | DNT 2,6 | DNT 3,4 | TNT 2,4,6 | TNT 2,4,5 |
|---|---|---|---|---|---|---|---|---|---|---|---|---|---|---|---|
| A | Reagent | 200 | 1,375 | 1:6.9 | 328 | 109 | 49.1 | 4.1 | 40.6 | 4.5 | Trace | 1.0 | Trace | .67 | |
| B | Reagent plus 6.4% NT.[a] | 214 | 1,375 | 1:6.9 | 346 | 115 | 51.1 | 3.6 | 32.5 | 8.6 | .1 | 1.6 | .1 | 2.3 | |

[a] NT equals nitrotoluenes from Mahon water.

TABLE 2

Preparation of Dinitrotoluenes

| Run No. | Origin of mono-oil | Quantity mono-oil, g. | Quantity bi-acid, g. | Ratio oil:acid | Bi-oil product, g. | Percent yield[a] | DNT 2,4 | DNT 2,5 | DNT 2,6 | DNT 3,4 | TNT 2,4,5 | TNT 2,4,6 |
|---|---|---|---|---|---|---|---|---|---|---|---|---|
| A | Run A (Table 1) | 253 | 1,079 | 1:4.2 | 440 | 131 | 52.9 | .6 | 15.8 | 1.7 | .3 | 28.7 |
| B | Run B (Table 1) | 275 | 1,172 | 1:4.2 | 473 | 129 | 54.7 | .6 | 14.4 | 1.5 | .4 | 28.4 |

[a] Overall yield of crude bi-oil calculated on the basis of initial quantity of toluene.

TABLE 3

Preparation of Trinitrotoluene

| Run No. | Origin of bi-oil | Quantity of bi-oil, g. | Quantity of tri-acid, g. | TNT crude, g. | TNT after melt-wash and drying, g. | Overall yield,[a] percent |
|---|---|---|---|---|---|---|
| A | Run A (Table 2) | 440 | 1,030 | 286 | 254 | 67 |
| B | Run B (Table 2) | 473 | 1,150 | 286 | 243 | 62 |

[a] Overall yield calculated on the basis of initial quantity of toluene used.

TABLE 4

Isomeric Composition of TNT Samples

| | TNT before sellite | | | | TNT after sellite, prior to melt-wash | | | | Purified TNT | | | |
|---|---|---|---|---|---|---|---|---|---|---|---|---|
| | DNT | TNT | | Unknown | DNT | TNT | | Unknown | DNT | TNT | | Unknown |
| Run No. | 2,4 | 2,3,4 | 2,3,5 | 2,4,5 | | 2,4 | 2,3,4 | 2,3,5 | 2,4,5 | | 2,4 | 2,3,4 | 2,3,5 | 2,4,5 | |
| A | .08 | 2.56 | .16 | 3.92 | 6.78 | 0 | 0 | 0 | .04 | 0 | 0 | 0 | 0 | .04 | 0 |
| B | .04 | 1.98 | .10 | 2.95 | 12.20 | 0 | 0 | 0 | .04 | 0 | 0 | 0 | 0 | .04 | 0 |

Table 4 shows that
1. the sellite purification process removes all impurities save for a trace of the 2,4,5 TNT isomer.
2. the TNT obtained from the toluene containing 6.4 percent nitrotoluenes is identical in composition to the TNT obtained from reagent grade toluene.

EXAMPLE 2

4,000 ml of Mahon water identical with that used in Example 1 was extracted with 462 ml of toluene in 8 extraction steps as follows: 500 ml of Mahon water and 462 ml of toluene were vigorously shaken in a separatory funnel, after which the phases were allowed to separate and the aqueous layer was discarded. The toluene layer was employed to extract the nitrotoluenes from seven 500 ml portions of the Mahon water, resulting in an extraction ratio of 1 volume toluene to 8.6 volumes Mahon water. The toluene extract thus obtained, containing 0.27 percent nitrotoluenes, was nitrated and processed to purified TNT according to the procedure described in Example 1. The TNT thus obtained was of military specification grade.

The process of the invention can be similarly utilized for treating other aqueous liquors containing mono-, di- and trinitrotoluenes, such as are obtained in the production of TNT, including manufacturing, loading and reclaiming operations. It is unsatisfactory for use with so-called "red-water," obtained in the purification of crude TNT with sellite solution (aqueous $Na_2SO_3$), since most of the nitrotoluene compounds are present therein as water-soluble sulfonates, which in the form of the sodium salts or free sulfonic acids are not significantly soluble in toluene and hence are not satisfactorily extracted thereby.

I wish it to be understood that I do not desire to be limited to the exact method and detail of construction described for obvious modification will occur to persons skilled in the art.

I claim:
1. A process for recovering and recycling nitrotoluenes present in aqueous waste liquor obtained in the production of TNT, which comprises intimately mixing such liquor with toluene to dissolve and extract said nitrotoluenes in the toluene, and subjecting the toluene solution of said nitrotoluenes to nitration to form TNT.
2. A process according to claim 1, wherein said waste liquor contains di- and trinitrotoluenes.

3. A process according to claim 2, wherein the aqueous waste liquor contains less than about 0.1 percent di- and trinitrotoluenes and the amount of di- and trinitrotoluenes dissolved in the toluene does not exceed about 10 percent.

4. A process according to claim 3, wherein the aqueous waste liquor is obtained by water washing the vapors produced in the concentration of spent sulfuric acid recovered from the nitration of toluene to TNT with a mixture of nitric and sulfuric acids.

* * * * *